United States Patent [19]

Keating

[11] Patent Number: 5,500,232
[45] Date of Patent: Mar. 19, 1996

[54] CALCIUM FORTIFIED BEVERAGES

[75] Inventor: Kim R. Keating, Evansville, Ind.

[73] Assignee: Bristol-Myers Squibb Company, Princeton, N.J.

[21] Appl. No.: 319,215

[22] Filed: Oct. 6, 1994

[51] Int. Cl.⁶ ............................... A23L 1/304; A23L 2/00
[52] U.S. Cl. ..................... 426/74; 426/590; 426/599; 426/650
[58] Field of Search .................. 426/74, 590, 599, 426/650

[56] References Cited

U.S. PATENT DOCUMENTS

| | | | |
|---|---|---|---|
| 4,477,478 | 10/1984 | Tiberio et al. | 426/330.6 |
| 4,722,847 | 2/1988 | Heckert | 426/74 |
| 4,737,375 | 4/1988 | Nakei et al. | 426/590 |
| 4,740,380 | 4/1988 | Melachouris et al. | 426/590 |
| 4,756,919 | 7/1988 | Cirigiano et al. | 426/330 |
| 4,772,467 | 9/1988 | Pak | 424/127 |
| 4,814,177 | 3/1989 | Walsdorf et al. | 424/464 |
| 4,830,862 | 5/1989 | Braun et al. | 426/74 |
| 4,851,221 | 7/1989 | Pak et al. | 424/693 |
| 4,871,554 | 10/1989 | Kalala et al. | 426/74 |
| 4,919,963 | 4/1990 | Heckert | 426/599 |
| 5,028,446 | 7/1991 | Saleeb et al. | 426/590 |

FOREIGN PATENT DOCUMENTS 2207335  2/1989  United Kingdom.

OTHER PUBLICATIONS

Wm. Howlett Gardner, Food Acidulants, Allied Chemical Corporation, Chapters 1, 2, 4 and 7, 1966.
Thomas E. Furia, Handbook of Food Additives, Published by The Chemical Rubber Company, Chapter 6, 1968.

*Primary Examiner*—Helen Pratt
*Attorney, Agent, or Firm*—Thomas R. Savitsky

[57] ABSTRACT

Calcium fortified acid beverages. The calcium source is a combination of calcium hydroxide and calcium glycerophosphate and the acidulant is a combination of citric acid and fumaric acid.

11 Claims, No Drawings

CALCIUM FORTIFIED BEVERAGES

FIELD OF THE INVENTION

The present invention concerns beverages that are stable upon storage which contain a calcium source and an acidulant.

BACKGROUND OF THE INVENTION

Calcium is an important element in the diets of mammals, especially humans. Calcium is required for adequate bone formation and maintenance. Calcium is also needed for various other diverse, metabolic body functions. Calcium deficiencies can result in significant health problems, for example, osteoporosis. Therefore, consuming a diet with adequate calcium is important for health and is useful to avoid various clinical conditions (see, for example, U.S. Pat. Nos. 4,851,221, 4,740,380, and 4,737,375, the disclosures of which are incorporated herein by reference in their entirety).

One of the major sources of dietary calcium is dairy products, particularly milk. However, many people do not consume milk in quantities sufficient to provide adequate calcium for various reasons, such as taste, lactose intolerance, and the like. Conversely, consumption of other beverages, such as soft drinks and New Age beverages such as water drinks and juice-based drinks (e.g., Snapple, Quest, Clearly Canadian and various teas such as Nestea and Lipton), is common and popular for most people in everyday life. Thus, it would be highly desirable to have an improved calcium supplemented beverage that can be utilized in the same manner as beverages commonly in use. One of the problems in supplementing such beverages with calcium is poor storage stability due to the solubility of calcium compounds in aqueous media.

It would be highly desirable to have an improved palatable, acidic, non-dairy, storage-stable beverage supplemented with significant amounts of calcium.

SUMMARY OF THE INVENTION

It has been unexpectedly discovered that use of certain combinations of calcium compounds and/or acids will result in a beverage of improved storage stability.

In one aspect the present invention is directed to a calcium fortified, storage-stable beverage comprising:

(a) an acidulant which comprises citric acid and fumaric acid, and (b) a calcium source which comprises calcium hydroxide and calcium glycerophosphate.

In another aspect the present invention is directed to a calcium fortified, storage-stable beverage comprising water, an acidulant, and a calcium source which comprises calcium hydroxide and calcium glycerophosphate.

In yet another aspect the present invention is directed to a calcium fortified, storage-stable beverage comprising water, a calcium source, and an acidulant which comprises citric acid and fumaric acid.

DETAILED DESCRIPTION OF THE INVENTION

The amount of calcium source in the beverage of the invention is preferably about 0.01 to about 3 weight percent, more preferably about 0.05 to about 1.5 weight percent, and most preferably about 0.1 to about 1.0, based on the total weight percent of the beverage.

It has been discovered that use of a calcium source comprising calcium hydroxide and calcium glycerophosphate with any acidulant will result in a product having a marked improvement in storage stability. Preferably the calcium source comprises about 5 to about 95 weight percent, more preferably about 20 to about 85 weight percent, and most preferably about 60 to about 80 weight percent calcium hydroxide; and about 5 to about 95 weight percent, more preferably about 15 to about 80 weight percent, and most preferably about 20 to about 40 weight percent calcium glycerophosphate. In addition to increasing storage stability, another advantage of using a combination of calcium hydroxide and calcium glycerophosphate as the calcium source is that less acidulant is required to achieve a desired lowering of pH. The reduction in total amount of acidulant lowers product tartness, thereby enhancing product flavor as well as contributing to calcium solubility by lowering the amount of mineral salts that could potentially form.

Other food grade organic or inorganic calcium compounds are optionally present as part of the calcium source in the beverage of the invention. Such optional calcium compounds include calcium oxide, calcium carbonate, calcium orthophosphate(s) (mono-, di-, and tricalcium phosphate), calcium gluconate, calcium glubionate (a.k.a. Calcium D-gluconate lactobionate monohydrate), calcium gluceptate, calcium lactate, calcium levulinate, calcium lactophosphate, calcium citrate, calcium acetate, calcium ascorbate, calcium tartarate, calcium malate, calcium chloride, and the like and mixtures thereof. Any of these calcium compounds may be used as long as they do not adversely affect the stability of the beverage in which they are used.

When the beverage of the invention contains a combination of calcium hydroxide and calcium glycerophosphate as the calcium source, any food grade acid may be used as the acidulant. Thus, acids that can be used as the acidulant include citric acid, malic acid, fumaric acid, adipic acid, phosphoric acid, tartaric acid, lactic acid, gluconic acid, succinic acid, oxalic acid, or a mixture thereof.

The amount of acidulant in the beverage of the invention is preferably about 0.05 to about 5 weight percent, more preferably about .1 to about 3 weight percent, even more preferably about 0.15 to 1.75 weight, and most preferably about 0.25 to about 1 percent, based on the total weight of the beverage. The acidulant will contribute to flavor or taste as well as lower the pH.

The present invention is also based on the unexpected discovery that use of a combination of citric acid and fumaric acid as the acidulant will result in beverages having improved stability. Thus, when citric acid and fumaric acid are used as the acidulant, the calcium source need not require a combination of calcium hydroxide and calcium glycerophosphate, but can be any of the aforementioned calcium compounds or a combination thereof. Preferably the acidulant comprises about 5 to about 95 weight percent, more preferably about 10 to about 80 weight percent, and most preferably about 15 to about 60 weight percent citric acid; and about 5 to about 95 weight percent, more preferably about 20 to about 90 weight percent, and most preferably about 40 to about 85 weight percent fumaric acid.

Use of fumaric acid has at least three major advantages: (1) effect on flavor, it will lower the pH without contributing additional tartness; (2) has a greater impact on pH, total amount of acid required to reach a desired pH is decreased; and (3) the calcium salt of fumaric acid, calcium fumarate, has a higher degree of solubility in comparison to many other calcium salts such as calcium citrate. Therefore, using fumaric acid allows for a decrease in the total amount of acid required to achieve a lower pH without contributing additional tartness. Furthermore, the reduction in acid quantities decreases the natural tendency of insoluble calcium salt formation.

The pH of the beverage of the invention is determined primarily by the amount and chemical nature of the acidulant. The pH of the beverage is about 2 to about 5, preferably about 3 to about 4.3. The pH is important to solubility of calcium compounds and flavor. In general, solubility of calcium compounds (and therefore product stability) increases with decreasing pH. Conversely, for many products desirable tartness decreases with decreasing pH at the pH levels of interest. Thus, the beverage of the invention is particularly advantageous since satisfactory tartness can be achieved, even at lower pH's.

The beverages of the invention are palatable. Therefore, the combinations and amounts of calcium compounds and acids used for a particular formulation provide an acceptable flavor. For example, the use of calcium chloride is generaly undesirable due to undesirable flavor characteristics whereas the use of calcium hydroxide does not impart undesirable flavor characteristics.

The beverage of the invention is optionally carbonated to provide organoleptic qualities similar to known soft drinks or water drinks according to known techniques. If carbonated, it is preferably carbonated to a level of about 1.5 to about 3.5 atmospheres, more preferably to about 1.7 to about 2.3 atmospheres.

It is important for some preferred embodiments of the invention that the beverage is clear, e.g., water drinks; clarity is less important for other embodiments, e.g., juice drinks.

Of course the beverage of the invention contains a substantial amount of water. Typically the amount of water is about 75 to about 99.5 weight percent, preferably about 80 to about 97 weight percent, and more preferably about 90 to about 96 weight percent, based on the total weight of the beverage.

The acidic beverage of the present invention is preferably flavored and sweetened to improve its organoleptic acceptability. Known natural sweetening agents such as corn syrup solids, lactose, glucose, fructose, sucrose, maltodextrin, sugar alcohols, and the like, as well as alternative sweeteners such as saccharin, cyclamates, sucralose acesulfame-K, and aspartame can be added in an amount sufficient to provide a sweet flavor. A preferred sweetener is fructose. The amount of sweetener will vary to taste but is typically about 0.001 to about 20 weight percent, preferably about 2 to about 12 weight percent, based on the total beverage weight.

Natural and artificial flavorants including fruit and cola flavors can also be added. The composition of the present invention can also include fruit juice or fruit juice extract, preferably without suspended particulates, such as citrus fruits and/or cranberry juice, as desired. Preferred flavorants include cherry, strawberry, raspberry, mandarin orange, blackberry, tea, kiwi-lime, or a mixture thereof. Flavorants can be obtained from commercial suppliers, and such flavorants typically contain additives normally used in the flavorants industry, for example, solvents such as ethanol, sweeteners such as high fructose corn syrup, acids such as citric acid, and the like. The amount of flavorant composition (i.e., flavorant plus flavorant additives) will vary to taste and can be, for example, about 0.01 to about 50 weight percent, preferably about 0.1 to about 10 weight percent, based on the total beverage weight. Natural or artificial coloring also can be added as desired.

The beverage composition of the invention can also include other ingredients normally found in beverages, such as clouding agents, preservatives, such as potassium sorbate, and the like. The beverages can also contain protein for protein fortification, vitamins and minerals, as well as agents which contribute to calcium absorption. Preferably, the additives do not incorporate additional particulates in the beverage. Preferably, fully soluble materials such as protein hydrolysates can be used. Clouding agents such as whey protein can be added to simulate natural pulp.

A preferred beverage of the invention comprises:
(a) about 0.05 to about 5 weight percent of an acidulant which comprises about 5 to about 95 weight percent citric acid and about 5 to about 95 weight percent fumaric acid,
(b) about 0.01 to about 3.0 weight percent of a calcium source which comprises about 5 to about 95 weight percent calcium hydroxide and about 5 to about 95 weight percent calcium glycerophosphate,
(c) about 0.01 to about 50 weight percent of a flavorant,
(d) about 0.001 to about 20 weight percent of a sweetener,
(e) about 75 to about 99.5 weight percent water,
wherein said beverage is carbonated and is at a pH of about 3 to about 4.3.

The beverage of the invention is storage stable. By "storage stable" is meant absence of insoluble, undesirable dust or particulate matter, in particular calcium salts, visible to the naked eye upon storage. Thus, it is preferred that when the beverage of the invention is stored in a sealed container at 45° C. and/or at room temperature (25° C.±3° C.) that no visible dust or particulate matter are formed at 3 months, preferably at 6 months, more preferably at 9 months, and most preferably at 12 months. The beverage of the invention can be prepared by procedures known in the art and/or taught herein. Heat treatment is typically performed to pasteurize the beverage. A preferred procedure for preparing the beverage of the invention is as follows:

Weigh each ingredient individually and add to a premeasured volume of water. Stir mixture until all ingredients are dissolved. Carbonate to desired level, fill, then pasteurize.

The water can be warmed slightly (e.g., 37° C.–43° C.) if desired.

The following examples are to illustrate the invention but should not be interpreted as a limitation thereon. All percentages are by weight unless specified otherwise.

| | CALCIUM FORTIFIED BEVERAGE CONTAINING STRAWBERRY CHERRY FLAVOR | | | |
|---|---|---|---|---|
| Ingredients | Amount (g per serving) | % | Moles | % Moles |
| Water | 282.94 | 93.45 | 15.701443 | 99.115382 |

CALCIUM FORTIFIED BEVERAGE CONTAINING STRAWBERRY CHERRY FLAVOR -continued

| Ingredients | Amount (g per serving) | % | Moles | % Moles |
|---|---|---|---|---|
| Fructose | 16.60 | 5.48 | 0.092140 | 0.581636 |
| Fumaric Acid | 0.96 | 0.32 | 0.008271 | 0.052210 |
| Citric Acid | 0.55 | 0.18 | 0.002863 | 0.018071 |
| Ca Glycerophosphate | 0.50 | 0.17 | 0.002379 | 0.015019 |
| Calcium Hydroxide | 0.41 | 0.14 | 0.005533 | 0.034927 |
| Strawberry Cherry | 0.80 | 0.26 | | |
| Water | 0.4114 | | 0.022830 | 0.144116 |
| Propylene Glycol | 0.2194 | | 0.002883 | 0.018202 |
| Ethanol | 0.1480 | | 0.003212 | 0.020279 |
| Citric Acid | 0.0048 | | 0.000025 | 0.000158 |
| Flavor Actives | 0.0164 | | | |
| Total | 302.76 | 100% | 15.8416 | 100.000 |

CALCIUM FORTIFIED BEVERAGE CONTAINING RASPBERRY FLAVOR

| Ingredients | Amount (g per serving) | % | Moles | % Moles |
|---|---|---|---|---|
| Water | 283.26 | 93.55 | 15.719201 | 99.271337 |
| Fructose | 16.60 | 5.48 | 0.092140 | 0.581893 |
| Fumaric Acid | 0.96 | 0.32 | 0.008271 | 0.052233 |
| Citric Acid | 0.55 | 0.18 | 0.002863 | 0.018079 |
| Ca Glycerophosphate | 0.50 | 0.16 | 0.002379 | 0.015026 |
| Calcium Hydroxide | 0.41 | 0.14 | 0.005533 | 0.034943 |
| Raspberry | 0.51 | 0.17 | | |
| Flavor Actives | 0.1957 | | | |
| High Fruct Corn Syr | 0.1632 | | 0.000907 | 0.005726 |
| Ethanol | 0.129 | | 0.002800 | 0.017683 |
| Citric Acid | 0.0148 | | 0.000077 | 0.000486 |
| Water | 0.0074 | | 0.000411 | 0.002593 |
| Total | 302.79 | 100% | 15.8346 | 100.000 |

CALCIUM FORTIFIED BEVERAGE CONTAINING MANDARIN ORANGE FLAVOR

| Ingredients | Amount (g per serving) | % | Moles | % Moles |
|---|---|---|---|---|
| Water | 283.36 | 93.60 | 15.724750 | 99.228719 |
| Fructose | 16.60 | 5.48 | 0.092140 | 0.581438 |
| Fumaric Acid | 0.96 | 0.32 | 0.008271 | 0.052192 |
| Citric Acid | 0.55 | 0.18 | 0.002863 | 0.018065 |
| Ca Glycerophosphate | 0.50 | 0.17 | 0.002379 | 0.015014 |
| Calcium Hydroxide | 0.41 | 0.14 | 0.005533 | 0.034916 |
| Mandarin Orange | 0.34 | 0.11 | | |
| Ethanol | 0.2020 | | 00043846 | 0.027668 |
| Water | 0.1199 | | 0.006654 | 0.041987 |
| Flavor Actives | 0.0182 | | | |
| Total | 302.72 | 100% | 15.8470 | 100.000 |

EXAMPLE 4 - Stability Studies

EXPERIMENT I

The effect of heat treatment on the solubility of calcium from different calcium sources was investigated. Three calcium sources were evaluated: calcium hydroxide, calcium carbonate, calcium glycerophosphate, as well as a combination of calcium hydroxide (70% of total calcium) and calcium glycerophosphate (30% of total calcium). All products were formulated to contain 300 mg of calcium per 10 fl. oz., acidified with citric acid to a pH of 4.0 and sweetened with crystalline fructose. Each formulation was tested under the following conditions: no heat and heat processing at 60° C. F/10 min., 68° C. F/5 min., and 74° C. F/10 min. Results of experiment 1 are shown in Table 1.

Regardless of the thermal process, insoluble calcium salts formed in the calcium carbonate samples within one week of manufacture. The calcium hydroxide source appeared to be more stable, in that the calcium remained in solution slightly longer than the calcium carbonate sample, 21 days versus 5 days, respectively. Calcium glycerophosphate and 70% calcium hydroxide plus 30% calcium glycerophosphate, to date, have remained in solution (processed on Feb. 28, 1994). In this experiment, the heat treatments (no heat, 60° C. F/10 min., 68° C. F/5 min., 74° F/10 min.) had no effect on the solubility of calcium.

The pH in all treatments was to be controlled and maintained at pH 4.0. However, it was discovered that when replacing 30% of the total calcium from calcium hydroxide with calcium glycerophosphate, calcium glycerophosphate lowered the pH to 3.75, even though slightly less citric acid (1.8 g vs 1.9 g) was used.

EXPERIMENT II

Six different calcium sources were evaluated at two different pH's, 4.0 and 3.5. Each product was acidified with citric acid (100%) and citric acid (about 80%) plus fumaric acid (about 20%) to pH 4.0. The exact amount of citric acid added was dependent on the calcium source. The level of fumaric acid was held constant between calcium treatments. In the 100% calcium hydroxide sample, two additional acid combinations were tested: (1) ratio of citric acid to fumaric acid was changed in that 62% of the total acid was fumaric and (2) citric/fumaric/tartaric.

The pH of all samples was lowered to 3.5 by adding additional citric acid to the pH 4.0 samples. The percent of citric acid increased from approximately 80% of the total amount of acid to about 88%. Due to the fumaric's slow rate of solution, the amount of fumaric acid was held constant, that is the amount of fumaric acid in the pH 3.5 samples was identical to the amount in the pH 4.0 samples. This caused the percent of fumaric acid to be reduced to about 12%. In the fumaric (62%)/citric(38%) sample, the citric acid increased to 66% of the total acid to pH 3.5.

All samples were heat treated for 165 ° C. for 10 minutes. All samples were also preserved with 0.03% potassium sorbate.

The results presented in Table 2A show that pH, acid, and calcium source each affect calcium solubility. Beginning with pH, it is very clear when products at pH 4.0 are compared to the same product at 3.5, that pH has a significant effect on calcium solubility. In each case, regardless of calcium source or acid, samples at pH 3.5 remained clear for a longer period of time than their counterpart samples at pH 4.0. The solubility of calcium was also affected by the acid source. At room temperature storage, the calcium in samples acidified with both citric acid and fumaric acid had remained in solution for a longer period of time compared to the same calcium sample acidified with only citric acid. Additionally, the calcium hydroxide sample acidified with higher proportion of fumaric acid at the lower temperatures remained in solution the longest, even at the higher pH. In many cases, the calcium in samples containing 80% calcium hydroxide+ 20% calcium glycerophosphate remained in solution for a longer period of time.

The above experiement was also conducted whereby samples were preserved by adding 0.03% potassium sorbate instead of being heat processed. In general, the results of the preserved samples are similar to those outlined above (Table 2B).

EXPERIMENT III

Products were formulated at pH 3.9, 3.7, and 3.5. To offset the increasing tartness, three levels of sweetness were evaluated. As revealed in Experiment II, fumaric acid and citric acid together appeared to be more functionally favorable. The ratio between the two acids, 53% fumaric and 47% citric acid, was maintained as the pH was adjusted from 3.9 to 3.5.

Results are shown in Table 3. Calcium has remained in solution for $\geq 6$ months in all the samples except three. These three samples contained calcium hydroxide as the sole source of calcium. This further supports the use of a calcium hydroxide/calcium glycerophosphate combination.

EXPERIMENT IV

In addition to citric, fumaric was used in combination with malic, phosphoric, adipic, and tartaric. Each acid combination was tested in products fortified with calcium hydroxide and 70% calcium hydroxide plus 30% calcium glycerophosphate at pH 3.7 and 3.5.

The results of this experiment are incomplete (Table 4); the experiment is still in progress. However, relevant information can be obtained from the products in which calcium salts have formed. The calcium source in all but one of the precipitated products was calcium hydroxide. As in previous experiments, calcium hydroxide plus calcium glycerophosphate was a better source of calcium.

TABLE 1

EXPERIMENT I: Effect of heat treatment and calcium source on calcium solubility.

| CALCIUM SOURCE | HEAT TREATMENT | PRODUCT PH | CITRIC ACID LEVEL | RESULTS |
| --- | --- | --- | --- | --- |
| 100% Calcium Carbonate | No Heat Treatment | 4.0 | 1.9 | 5 day |
|  | 140° F. 10 min. | 4.0 | " | " |
|  | 155° F. 5 min. | 4.0 | " | " |
|  | 165° F. 10 min. | 4.0 | " | " |
| 100% Calcium Hydroxide | No Heat Treatment | 4.00 | 1.8 | 21 day |
|  | 140° F. 10 min. | 4.00 | " | " |
|  | 155° F. 5 min. | 4.00 | " | " |
|  | 165° F. 10 min. | 4.00 | " | " |
| 100% Calcium Glycerophosp | No Heat Treatment | 3.80 | 1.2 | Clear Solution[1] |
|  | 140° F. 10 min. | 3.80 | " | " |

TABLE 1-continued

EXPERIMENT I: Effect of heat treatment and calcium source on calcium solubility.

| CALCIUM SOURCE | HEAT TREATMENT | PRODUCT PH | CITRIC ACID LEVEL | RESULTS |
|---|---|---|---|---|
| | 155° F. 5 min. | 3.80 | " | " |
| | 165° F. 10 min. | 3.80 | " | " |
| 70% Calcium Hydroxide + 30% Calcium Glycerophosp | No Heat Treatment | 3.75 | 1.8 | Clear Solution |
| | 140° F. 10 min. | 3.75 | " | " |
| | 155° F. 5 min. | 3.75 | " | " |
| | 165° F. 10 min. | 3.75 | " | " |

[1]The solutions are clear to date, stored for more than 6 months.

TABLE 2A

EXPERIMENT II: Effect of pH, acid source, and calcium source on the solubility of calcium in heat treated samples.
HEAT TREATED
(160° F. 10 min.)

| CALCIUM SOURCE | ACID | ROOM TEMP STORAGE | | 5° C. STORAGE | | 37° C. STORAGE | | 45° C. STORAGE | |
|---|---|---|---|---|---|---|---|---|---|
| | | PH 4.0 | PH 3.5 | PH 4.0 | PH 3.5 | PH 4.0 | PH 3.5 | PH 4.0 | PH 3.5 |
| 100% Calcium hydroxide | Citric | 13 day | [1]* | ppt | * | 48 hr | 5 mon | 48 hr | 5 mon |
| | Citric/Fumaric | 36 day | * | * | * | 48 hr | 5 mon | 48 hr | * |
| | Fumaric/Citric | * | * | * | * | 13 day | 5 mon | 14 day | * |
| | Citric/Fumaric/Tartaric | 1.5 mon | * | * | * | 10 day | 5 mon | 10 day | * |
| 90% Calcium Hydroxide + 10% Calcium Carbonate | Citric | 10 day | * | ppt | * | 48 hr | * | 24 hr | * |
| | Citric/Fumaric | 28 day | * | ppt | * | 48 hr | 5 mon | 48 hr | * |
| 80% Calcium Hydroxide + 20% Calcium Carbonate | Citric | 10 day | * | ppt | * | 48 hr | * | 24 hr | 5 mon |
| | Citric/Fumaric | 36 day | * | * | * | 48 hr | 5 mon | 24 hr | * |
| 20% Calcium Hydroxide + 80% Calcium Carbonate | Citric | 10 day | * | ppt | * | 48 hr | 5 mon | 24 hr | 5 mon |
| | Citric/Fumaric | 25 day | * | * | * | 48 hr | 5 mon | 24 hr | * |
| 80% Calcium Hydroxide + 20% Calcium Glycerophos | Citric | 17 day | * | ppt | * | 48 hr | 5 mon | 48 hr | * |
| | Citric/Fumaric | * | * | * | * | 10 day | 5 mon | 10 day | * |
| 80% Calcium Hydroxide + 20% Calcium Chloride | Citric | 31 day | * | * | * | 48 hr | 5 mon | 24 hr | * |

[1]The asterisks (*) mean that the solutions are clear to date, stored for more than 6 months.

TABLE 2B

EXPERIMENT II: Effect of pH, acid source, and calcium source on the solubility of calcium in samples preserved with potassium sorbate.
PRESERVATIVE
(0.03% Potassium Sorbate)

| CALCIUM SOURCE | ACID | ROOM TEMP STORAGE | | 5° C. STORAGE | | 37° C. STORAGE | | 45° C. STORAGE | |
|---|---|---|---|---|---|---|---|---|---|
| | | PH 4.0 | PH 3.5 | PH 4.0 | PH 3.5 | PH 4.0 | PH 3.5 | PH 4.0 | PH 3.5 |
| 100% Calcium | Citric | 21 day | [1]* | ppt | * | 48 hr | 5 mon | 24 hr | 36 day |
| | Citric/Fumaric | 34 | * | * | * | 48 | 5 | 48 | * |

TABLE 2B-continued

EXPERIMENT II: Effect of pH, acid source, and calcium source on the solubility of calcium in samples preserved with potassium sorbate.
PRESERVATIVE
(0.03% Potassium Sorbate)

| CALCIUM SOURCE | ACID | ROOM TEMP STORAGE | | 5° C. STORAGE | | 37° C. STORAGE | | 45° C. STORAGE | |
|---|---|---|---|---|---|---|---|---|---|
| | | PH 4.0 | PH 3.5 | PH 4.0 | PH 3.5 | PH 4.0 | PH 3.5 | PH 4.0 | PH 3.5 |
| Hydroxide | Fumaric/Citric | day * | * | * | * | 11 day | 5 mon | 10 day | * |
| | Citric/ Fumaric/ Tartaric | 1.5 mon | * | * | * | 72 hr | 36 day | 48 hr | * |
| 90% Calcium Hydroxide + 10% Calcium Carbonate | Citric | 19 day | * | ppt | * | 48 hr | 36 day | 24 hr | * |
| | Citric/Fumaric | 33 day | * | ppt | * | 48 hr | 5 mon | 48 hr | * |
| 80% Calcium Hydroxide + 20% Calcium Carbonate | Citric | 21 day | * | ppt | * | 48 hr | 36 day | 24 hr | 5 mon |
| | Citric/Fumaric | 1.5 mon | * | * | * | 48 hr | 5 mon | 48 hr | * |
| 20% Calcium Hydroxide + 80% Calcium Carbonate | Citric | 11 day | * | ppt | * | 48 hr | 36 day | 24 hr | 4.5 mon |
| | Citric/Fumaric | 33 day | * | * | * | 48 hr | 36 day | 24 hr | 5 mon |
| 80% Calcium Hydroxide + 20% Calcium Glycerophos | Citric | 19 day | * | ppt | * | 48 hr | 36 day | 48 hr | 5 mon |
| | Citric/Fumaric | * | * | * | * | 72 hr | 4.5 mon | 48 hr | * |
| 80% Calcium Hydroxide + 20% Calcium Chloride | Citric | 31 day | * | * | * | 48 hr | 36 day | 48 hr | * |

[1]The asterisks (*) mean that the solutions are clear to date, stored for more than 6 months.

TABLE 3

EXPERIMENT III: Effect of pH and calcium source on calcium solubility.

| PRODUCT PH | CALCIUM SOURCE | FRUCTOSE LEVEL | ROOM TEMP STORAGE | 5° C. STORAGE | 37° C. STORAGE | 45° C. STORAGE |
|---|---|---|---|---|---|---|
| 3.9 | 100% Calcium Hydroxide | 15.5 | [1]* | * | 5 mon | * |
| | | 17.5 | * | * | 5 mon | * |
| | | 20.0 | * | * | 6 mon | * |
| | 70% Calcium Hydroxide + 30% Calcium Glycerophosp | 15.5 | * | * | * | * |
| | | 17.5 | * | * | * | * |
| | | 20.0 | * | * | * | * |
| 3.7 | 100% Calcium Hydroxide | 15.5 | * | * | * | * |
| | | 17.5 | * | * | * | * |
| | | 20.0 | * | * | * | * |
| | 70% Calcium Hydroxide + 30% Calcium Glycerophosp | 15.5 | * | * | * | * |
| | | 17.5 | * | * | * | * |
| | | 20.0 | * | * | * | * |
| 3.5 | 100% Calcium Hydroxide | 15.5 | * | * | * | * |
| | | 17.5 | * | * | * | * |
| | | 20.0 | * | * | * | * |
| | 70% Calcium Hydroxide + 30% Calcium Glycerophosp | 15.5 | * | * | * | * |
| | | 17.5 | * | * | * | * |
| | | 20.0 | * | * | * | * |

[1]The asterisks (*) mean that the solutions are clear to date, stored for more than 6 months.

TABLE 4

EXPERIMENT IV: Effect of acid source and calcium source on calcium solubility.

| ACID SOURCE | CALCIUM SOURCE | ROOM TEMP STORAGE | | 5° C. STORAGE | | 37° C. STORAGE | | 45° C. STORAGE | |
| --- | --- | --- | --- | --- | --- | --- | --- | --- | --- |
| | | PH 3.7 | PH 3.5 | PH 3.7 | PH 3.5 | PH 3.7 | PH 3.5 | PH 3.7 | PH 3.5 |
| Fumaric + Citric | 100% Calcium Hydroxide | 1* | * | * | * | * | * | * | * |
| | 70% CAOH + 30% CaGlyphos | * | * | * | * | * | * | 4 mon | * |
| Fumaric + Citric | 100% Calcium Hydroxide | * | * | * | * | * | * | * | * |
| | 70% CAOH + 30% CaGlyphos | * | * | * | * | * | * | * | * |
| | 50% CAOH + 50% CaGlyphos | * | * | * | * | * | * | * | * |
| Fumaric + Malic | 100% Calcium Hydroxide | * | * | * | * | 5 mon | * | 4 mon | * |
| | 70% CAOH + 30% CaGlyphos | * | * | * | * | * | * | * | * |
| Fumaric + Phosphoric | 100% Calcium Hydroxide | 4 mon | 4 mon | * | * | * | * | 4 mon | 4 mon |
| | 70% CAOH + 30% CaClyphos | * | * | * | * | * | * | * | * |
| Fumaric + Citric + Adipic | 100% Calcium Hydroxide | * | * | 5 mon | * | 5 mon | 5 mon | 4 mon | 4 mon |
| | 70% CAOH + 30% CaGlyphos | * | * | * | * | * | * | * | * |
| Fumaric + Citric + Adipic | 100% Calcium Hydroxide | 1* | * | * | * | * | * | * | * |
| | 70% CAOH + 30% CaGlycP | * | * | * | * | * | * | * | * |
| Fumaric + Malic + Adipic | 100% Calcium Hydroxide | * | * | * | * | * | * | * | * |
| | 70% CAOH + 30% CaGlycP | * | * | * | * | * | * | * | * |
| Fumaric + Phosphoric + Adipic | 100% Calcium Hydroxide | 4 mon | 4 mon | * | * | * | * | 4 mon | 4 mon |
| | 70% CAOH + 30% CaGlycP | * | * | * | * | * | * | * | * |
| Fumaric + Citric + Tartaric | 100% Calcium Hydroxide | * | * | 5 mon | * | * | * | * | * |
| | 70% CAOH + 30% CaGlycP | * | * | * | * | * | * | * | * |

[1]The asterisks (*) mean that the solutions are clear to date, stored for more than 6 months.

What is claimed is:

1. A calcium fortified, storage-stable beverage consisting essentially of:
   (a) an acidulant which comprises about 5 to about 95 weight percent citric acid and about 5 to about 95 weight percent fumaric acid, and,
   (b) a calcium source which comprises about 5 to about 95 weight percent calcium hydroxide and about 5 to about 95 weight percent calcium glycerophosphate.

2. The calcium fortified beverage of claim 1 which further comprises a sweetener and a flavorant.

3. The calcium fortified beverage of claim 2 which is carbonated.

4. The calcium fortified beverage of claim 1 wherein component (a) comprises about 10 to about 80 weight percent citric acid and about 20 to about 90 weight percent fumaric acid, and component (b) comprises about 20 to about 85 weight percent calcium hydroxide and about 15 to about 80 weight percent calcium glycerophosphate.

5. The calcium fortified beverage of claim 1 wherein component (a) comprises about 15 to about 60 weight percent citric acid and about 40 to about 85 weight percent fumaric acid, and component (b) comprises about 60 to about 80 weight percent calcium hydroxide and about 20 to about 40 weight percent calcium glycerophosphate.

6. The calcium fortified beverage of claim 1 at a pH of about 3 to about 4.3.

7. The calcium fortified beverage of claim 1 wherein component (a) is present in an amount of about 0.05 to about 5 weight percent and component (b) is present in an amount of about 0.01 to about 3.0 weight percent.

8. The calcium fortified beverage of claim 1 wherein component (a) is present in an amount of about 0.25 to about 1 weight percent and component (b) is present in an amount of about 0. 1 to about 1.0 weight percent.

9. A calcium fortified beverage consisting essentially of:
   (a) about 0.05 to about 5 weight percent of an acidulant which comprises about 5 to about 95 weight percent citric acid and about 5 to about 95 weight percent fumaric acid,
   (b) about 0.01 to about 3.0 weight percent of a calcium source which comprises about 5 to about 95 weight percent calcium hydroxide and about 5 to about 95 weight percent calcium glycerophosphate,
   (c) about 0.01 to about 50 weight percent of a flavorant,
   (d) about 0.001 to about 20 weight percent of a sweetener, (e) about 75 to about 99.5 weight percent water, when said beverage is carbonated and is at a pH of about 3 to about 4.3.

10. The calcium fortified beverage of claim 9 when component (a) is present in an amount of about 0.25 to about 1 weight percent, component (b) is present in an amount of about 0.1 to about 1.0 weight percent, component (c) is present in an amount of about 0.1 to about 10 weight percent, component (d) is present in an amount of about 2 to about 12 weight percent, component (e) is present in an amount of about 80 to about 97 weight percent; and wherein component (a) comprises about 10 to about 80 weight percent citric acid and about 20 to about 90 weight percent fumaric acid and component (b) comprises about 20 to about 85 weight percent calcium hydroxide and about 15 to about 80 weight percent calcium glycerophosphate.

11. The calcium fortified beverage of claim 9 wherein component (a) comprises about 15 to about 60 weight percent citric acid and about 40 to about 85 weight percent fumaric acid, and component (b) comprises about 60 to about 80 weight percent calcium hydroxide and about 20 to about 40 weight percent calcium glycerophosphate.

* * * * *